I. L. LANDIS.
BRUSH OR UTENSIL HOLDER.
APPLICATION FILED DEC. 1, 1915.

1,186,915.

Patented June 13, 1916.

WITNESSES:
Henry Eifert
George Hanna

INVENTOR.
I. L. Landis
BY W. P. Barclay,
ATTORNEY.

UNITED STATES PATENT OFFICE.

ISRAEL L. LANDIS, OF CHICAGO, ILLINOIS.

BRUSH OR UTENSIL HOLDER.

1,186,915.  Specification of Letters Patent.  Patented June 13, 1916.

Application filed December 1, 1915. Serial No. 64,414.

*To all whom it may concern:*

Be it known that I, ISRAEL L. LANDIS, a citizen of the United States, residing at Chicago, in the county of Cook and State of Illinois, have invented certain new and useful Improvements in Brush or Utensil Holders, of which the following is a specification.

My invention relates particularly to brush or utensil holders that are used for domestic and household purposes, and that can be quickly attached to different utensils as occasion requires, and adjusted to suit different conditions of work, so as to facilitate the execution of the work to be done.

My invention consists in a rotatable member of particular configuration, provided with means for attaching the same to the head of a brush or other utensil and a handle upon which the said member may be clamped to any adjusted position of rotation; and my invention further consists in details of construction and in combination of parts, all as hereinafter described and particularly referred to in the claim.

Figure 3:
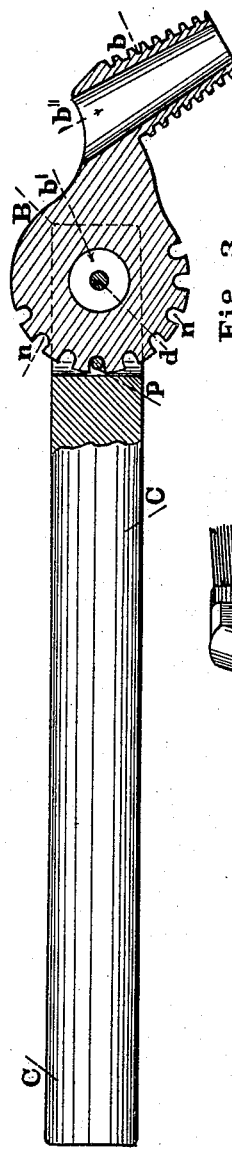
Figure 4:
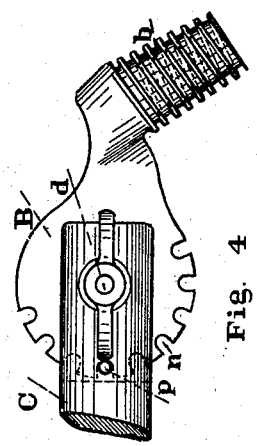
Figure 5:
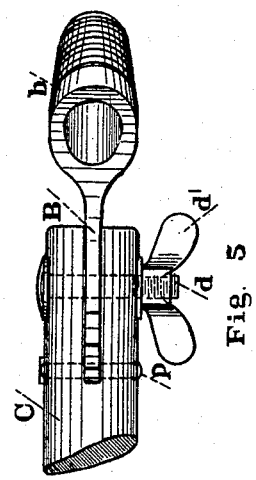
Figure 1:
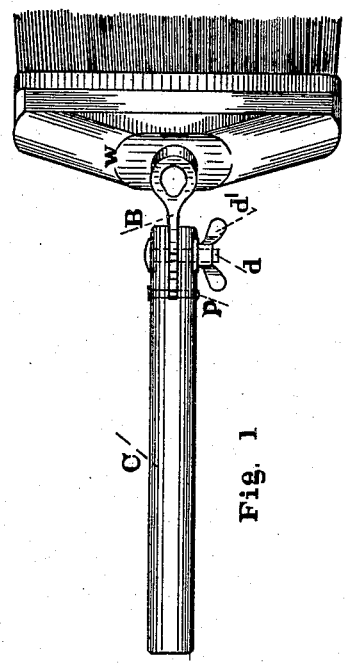
Figure 2:
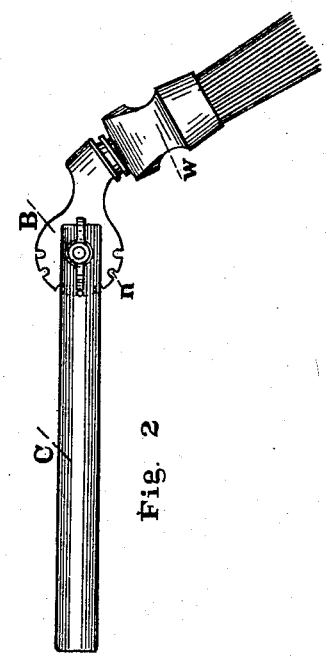

Figure 1, shows a general view of my invention attached to an ordinary whitewash brush $w$; and Fig. 2, is a side view of the same. Fig. 3, shows a sectional view of the adjustable disk part of my brush-holder in relation to its handle. Fig. 4, shows an exterior side view, and Fig. 5, shows an exterior end view of the brush or utensil holder in relation to its handle.

Similar letters of reference refer to similar parts throughout the several views.

Referring to the drawings, the adjustable disk part B, is preferably a metal casting and is formed with a conical plug part $b$ tangentially projecting beyond the periphery of the disk B, and the said conical plug part $b$ is formed with a screw thread on its exterior surface. Upon the periphery of the adjustable disk B numerous notches $n$, are formed that engage with a pawl or pin $p$ rigidly driven into the handle C, to which the adjustable disk is attached. The adjustable disk B is formed with a large central aperture $b''$ that permits the adjustable disk B to be disengaged from the catch-pin $p$ at any position, by drawing back the said disk off the catch $p$ subsequent to loosening the thumb nut $d'$ of the pivot bolt $d$, that is the means of firmly binding the adjustable disk B, to the handle C.

The conical plug $b$ of the adjustable disk, is preferably formed with a tapered or conical hole $b''$ in the direction of the length of the said conical plug for the handle of a small brush or other suitable utensil to take into, so as to enlarge the usefulness of the brush or utensil holder. The clamp bolt $d$, passes through one end of the handle C and is provided with a thumb nut $d'$, that is used to tighten and firmly hold the adjustable disk B to the handle C, or free the same from the handle when required. The catch-pin $p$, is relatively fixed in the handle C to the clamp bolt $d$, so that any notch $n$, of the adjustable disk can be located with the catch-pin $p$, and the conical plug part $b$ of the adjustable disk, set at different angles to the handle C of the brush or utensil holder as desired.

The brush or utensil holder is particularly adapted for service in connection with the ordinary whitewash and paste brushes, the heads of which are provided with suitably threaded orifices, in which the conical and threaded plug $b$, may be secured in the usual manner. It is also evident that the brush holder is also adapted to be used with different classes of utensils, such as a feather duster, a floor mop, or a window washer, where an adjustable means of holding such different utensils in executing work, is often a desired object.

Having described the several parts of my invention, what I claim is as follows:

In a brush and utensil holder, an adjustable peripherical notched disk formed with a screw threaded conical plug projecting tangentially from the periphery of the notched disk, and the said notched disk formed with a large central aperture, in combination with a handle provided with a catch-pin near one end of the handle, a thumb nut bolt passing through the handle and the central aperture of the notched disk, the said catch-pin and the thumb nut bolt being in proximity to each other, and the central aperture of the adjustable notched disk being of a size to permit the notched disk to be drawn back and free of contact with the catch-pin in the handle, so that the adjustable notched disk can be set at various angles to the handle, and clamped thereto, through the medium of the thumb nut and the bolt that passes through the large central aperture of the adjustable disk, and one end of the handle.

In testimony whereof I have signed my name to this specification in the presence of two subscribing witnesses.

ISRAEL L. LANDIS.

Witnesses:
GEORGE HANNA,
HENRY EIFERT.

Copies of this patent may be obtained for five cents each, by addressing the "Commissioner of Patents, Washington, D. C."